ns Patent [19]

Williams

[11] Patent Number: 4,664,847
[45] Date of Patent: May 12, 1987

[54] POLYMER COMPOSITIONS CONTAINING ENTRAPPED VOLATILE INGREDIENTS

[75] Inventor: Philip L. Williams, Barnet, England

[73] Assignee: Hydro Optics, Inc., Hackensack, N.J.

[21] Appl. No.: 637,685

[22] Filed: Aug. 3, 1984

Related U.S. Application Data

[63] Continuation of Ser. No. 422,395, Sep. 24, 1982, abandoned, which is a continuation of Ser. No. 288,409, Jul. 30, 1981, abandoned, which is a continuation of Ser. No. 199,498, Oct. 22, 1980, abandoned.

[30] Foreign Application Priority Data

Oct. 23, 1979 [GB] United Kingdom ............... 7936694

[51] Int. Cl.$^4$ ........................... A61K 7/46; C11B 9/00
[52] U.S. Cl. .................................. 252/522 A; 252/8.6; 252/522 R; 424/40
[58] Field of Search ................ 252/522 A, 8.6, 522 R; 424/33

[56] References Cited

U.S. PATENT DOCUMENTS

| 3,567,118 | 3/1971 | Shepherd et al. | 252/522 A |
| 3,681,248 | 8/1972 | Gould et al. | 252/522 A |
| 3,966,902 | 6/1976 | Chromecek | 252/522 A |

FOREIGN PATENT DOCUMENTS

| 2705218 | 8/1978 | Fed. Rep. of Germany . |
| 2380328 | 9/1978 | France . |

Primary Examiner—Helen M. S. Sneed
Attorney, Agent, or Firm—Kenyon & Kenyon

[57] ABSTRACT

A hydrophilic monomer such as hydroxypropyl methacrylate and a lipophilic monomer such as lauryl methacrylate are copolymerized in the presence of a fragrance or other volatile active ingredient. The resulting polymer contains entrapped active ingredient which tends not to exude from the polymer during storage yet is gradually released as vapor when the polymer is exposed to the atmosphere, e.g. as an air-freshener.

17 Claims, No Drawings

POLYMER COMPOSITIONS CONTAINING ENTRAPPED VOLATILE INGREDIENTS

This application is a continuation of application Ser. No. 422,395, filed Sept. 24, 1982, now abandoned, which in turn is a continuation of application Ser. No. 288,409 filed July 30, 1981 now abandoned, which, in turn, is a continuation of Ser. No. 199,498, filed Oct. 22, 1980, now abandoned.

This invention relates to synthetic hydrophilic polymer compositions. These polymers may be used to entrap volatile ingredients for subsequent gradual release to the atmosphere, see for example French Pat. No. 2,380,328.

We have found that in some cases when a hydrophilic polymer containing volatile ingredients is stored for a few weeks at ordinary temperature or for a few days at an elevated temperature such as 45° C. it may develop an exudation resulting in an undesirably greasy or wet surface. We have discovered that this tendency to exude may be greatly decreased or removed altogether, without impairment of the mechanical properties and appearance of the polymer or the rate of release of the active ingredient as vapour, if a certain proportion of the hydrophilic monomer used in the production of the polymer is replaced by a particular type of relatively lipophilic comonomer.

Our invention provides a synthetic hydroxyl-containing polymer which is derived from a mixture of unsaturated monomers comprising:

(A) 1 to 75% by weight of at least one alpha, beta- or beta, gamma-unsaturated carboxylic ester which has one or more lipophilic groups wherein each lipophilic group contains 5 to 22 carbon atoms;

(B) 25 to 99% by weight of at least one alpha, beta- or beta, gamma-unsaturated carboxylic ester whih has one or more hydrophilic groups; and (C) 0 to 50% by weight of one or more polyfunctional monomers, i.e. monomers having two or more polymerisable unsaturated groups in the molecule;
and which contains dissolved therein an effective amount of a volatilisable active ingredient.

The polymer composition may optionally also contain an inert liquid diluent or extender, or a mixture of diluents. The or each diluent may be an organic liquid which is compatible with, or soluble in, the polymer and which is compatible with (e.g. miscible with, soluble in or capable of dissolving) the active ingredient or a component thereof. A particular class of diluents comprises organic liquids having both hydrophilic and lipophilic characteristics, for example non-ionic or cationic surfactants, which in some cases may serve an additional useful purpose by improving the compatibility of the active ingredient with the polymer, i.e. functioning as a co-solvent.

Component (A) may contain one ester or a mixture of different esters. The or each ester in component (A) may be a 1-alkenyl or 2-alkenyl ester of a carboxylic acid which contains a lipophilic group e.g. a vinyl or allyl ester of a monocarboxylic acid having between 5 and 22 carbon atoms such as vinyl stearate. Preferably at least one ester, more preferably every ester in component (A) is derived from an alcohol, preferably monohydric, which contains a lipophilic group, and a beta, gamma-unsaturated or preferably alpha, beta-unsaturated carboxylic acid, for example acrylic, maleic or fumaric acid or an alkyl-substituted derivative thereof. The preferred esters (A) are alkyl esters of acrylic or methacrylic acid in which the alkyl group contains from 5 to 22 carbon atoms.

The or each lipophilic group may contain a branched-chain or straight chain, unsaturated or preferably saturated aliphatic hydrocarbyl group. In addition but less preferably it may contain one or more alicyclic or aromatic group, e.g. cyclohexyl or phenyl but preferably the hydrocarbyl group is acyclic. The lipophilic group contains 5 to 22, preferably 6 to 22 carbon atoms. Component (A) may contain a mixture of different esters, preferably esters having the same vinylic acid group and different lipophilic groups, especially where the different lipophilic groups are homologues, as in mixtures of lauryl, myristyl and cetyl methacrylates, or isomers, as in mixtures of isomeric branched-chain alkyl methacrylates. The average number of carbon atoms in the lipophilic groups of the esters in component (A) is preferably 8 to 18, e.g. 10 to 16.

Esters suitable for use in component (B) generally possess hydrophilic functions such as, for example, alkoxy or, preferably hydroxy groups. Typical monomers are hydroxyethyl acrylate, or preferably hydroxyethyl methacrylate, and the hydroxypropyl, hydroxybutyl and glyceryl esters of acrylic or methacrylic acid. Polyoxyalkylated derivatives of the foregoing monomers may also be used, such as polyoxyethylene monoacrylate or polyoxypropylene glyceryl monomethacrylate.

Usually the number of oxyalkylene groups is up to 20 although higher alkoxylates are operative and may be preferred for certain specialised applications. Glycidyl esters of unsaturated fatty acids may also be used as hydrophilic monomers. Esters of maleic and fumaric acid are less preferred.

The polyfunctional monomers in component (C) act as cross-linking agents and have the effect of increasing the hardness and rigidity of the polymeric product. Examples are the acrylates and methacrylates of polyhydroxylic compounds such as ethylene glycol; propylene glycol, 1,3-butylene glycol, 1,6-hexanediol, glycerol, pentaerythritol and trimethylolpropane, in each case at least two of the hydroxyl groups being esterified with acrylic or methacrylic acid. A particularly preferred cross-linking agent is trimethylolpropane trimethacrylate. Alkoxylated derivatives of hydroxy-containing polyfunctional monomers, and glycidyl esters are also operative.

The proportion of the esters of component (A) in the mixture of unsaturated monomers is 1 to 70% usually 2 to 40%, typically 3 to 30% preferably 5 to 25%, e.g. 10 to 20% by weight. The higher is the proportion of lipophilic groups in the monomer mixture the softer will be the texture of the resulting polymer. If required, a firmer texture may be produced by adjustment of the proportion of cross-linking agent in the monomer mixture. Additionally, the hardness and flexibility of the product depend on the amount and nature of the active ingredient and any diluent present, and the proportion of cross-linking agent may be varied to compensate for these effects also. No cross-linking agent need be added if a very soft polymer is required. However, some cross-linking agent will usually be included, up to 50%, generally up to 40%, typically up to 25% e.g. 10 to 20% by weight, based on the total weight of the monomer.

Monomers of relatively high volatility and therefore strong odour, such as ethyl methacrylate, isobutyl acrylate, vinyl chloride or styrene are preferably not used in the monomer mixture, partly because of the toxicity problems which usually arise in handling such monomers and partly because any traces of such monomers remaining in the polymer product may be deleterious to the odour, in addition to any possible toxicity hazard.

The active ingredient may be any volatile or volatilisable substance which it is desired to release from the polymer into the surrounding atmosphere in order to perform a useful function. The invention is particularly applicable to fragrances, including natural, essential oils and synthetic perfumes, and blends thereof. Typical perfumery materials which may form part of, or possible the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources of manufactured synthetically, as for example alcohols such as gernaiol, nerol, citronellol, linalol, tetrahydrogeraniol, betaphenylethyl alcohol, methyl phenyl carbinol, dimethyl benzyl carbinol, menthol or cedrol; acetates and other esters derived form such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and the methylionones; phenolic compounds such as eugenol and isoeugenol; synthetic musks such as musk xylene, musk ketone and ethylene brassylate. Typical active ingredients of our invention comprise at least five, usually at least ten of the foregoing, and/or other perfumery compounds and compositions.

Alternatively or additionally the active ingredient may comprise a volatile insecticide and/or insecticidal synergist, such as pyrethrum, or a bacteriostat or pheromone, or an active ingredient which is volatilised on heating, such as volatilisable fabric softeners of the type which may be volatilised when the resin is heated in, for example, a clothes drier, to soften fabrics therein.

The proportion of active ingredient may range from the minimum effective concentration, which will depend on the particular active ingredient, up to the maximum amount that can be incorporated in the resin, depending on the compatibility of the active ingredient with the polymer and on the nature and amount of any diluent present. It has been found possible, according to our invention to incorporate up to 200% of some active ingredients, based on the weight of the polymer. Other active ingredients may provide useful results in proportions as small as 100 ppm or even less. Typically, however, the proportion of active ingredient is between 2.5% and 100% based on the weight of the polymer, e.g. 5 to 50%.

The use of a liquid diluent presents a number of advantages. A problem which may be encountered in its absence is that an undesirably high temperature may be reached in the course of the exothermic polymerisation reaction, leading to possible degradation of the active ingredient or to internal strains and distortion in the polymer product. The use of a diluent alleviates this problem by moderating the temperature rise, while still permitting a product of satisfactory physical properties to be made by appropriate adjustment of the proportions of monomers. Flexibility in formulation is made possible by appropriate selection of the type of diluent in relation to the polar or non-polar characteristics of the active ingredient. To achieve the desired object of eliminating possible exudation on storage, it is necessary that the balance of polar and non-polar character in the liquid mixture (i.e. active ingredient plus diluent) should not differ too greatly from that in the polymer. Thus, for example, if the active ingredient is of predominantly non-polar character, comprising perhaps hydrocarbons, esters and the like, it may be found preferably to use a relatively polar diluent such as an alcohol. It is then possible to use a monomer mixture containing a smaller proportion of the lipophilic component than would have been the case in the absence of the polar diluent. Conversely, with a polar active ingredient it may be found desirable to use a relatively non-polar diluent such as an ester. Diluents of the surfactant type, which combine substantial hydrophilic and lipophilic groups in the same molecule, are of wide applicability with a range of active ingredients and polymer formulations.

It will be evident that the choice of diluent and of monomer mixture must be considered in relation to each other and to the nature of the active ingredient. Generally the final composition will be decided on the basis of the physical properties desired in the product, and on economic grounds. Increasing the proportion of lipophilic monomer normally results in a softer and more flexible product. Generally also an increase in the amount of liquid component (active ingredient plus diluent) gives a softer product, this being especially marked when the liquid comprises a high proportion of polar constituents, particularly alcohols. Hardness may be increased by raising the proportion of cross-linking agent in the monomer mixture. In most cases the diluent will be a relatively cheap material, so that there will be an economic advantage in maximizing its amount relative to the more expensive monomers.

We prefer for most purposes to use as diluents liquids of low volatility which will not evaporate to any appreciable extent from the polymer. Suitable liquids of low polarity are dialkyl phthalates such as diethyl phthalate, and benzyl benzoate. Among the more polar liquids, alcohols such as dipropylene glycol and liquid polyethylene glycols, e.g. those of mean molecular weight 400–600, are useful. Among the surfactant type, nonionic surfactants are particularly preferred, e.g. polyoxyalkylene condensates with fatty alcohols or alkyl phenols or with glycerol or sorbitol esters, or polyoxyalkylene esters of fatty acids. Typical examples include polyoxyethylene stearate, polyoxypropylene sorbitan monolaurate, polyoxyethylene glyceryl mono-oleate and polyoxyethylene nonylphenol. Particularly preferred is a polyoxyethylene nonylphenol having approximately 9 oxyethylene units in the molecule.

It is however preferable in some cases to use diluents of relatively high volatility, such as propanediol, diethylene glycol monoethyl ether, benzyl alcohol and phenoxyethanol. These have rates of evaporation comparable with those of a range of widely-used fragrance materials, so that in the particularly important case when the active ingredient is a fragrance they will co-evaporate with the latter. This can have an advantage in tending to maintain a relatively high concentration of active ingredient in the polymer and thus improving its rate of release in the later stages of its life. Diluents which are substantially more volatile than the active ingredient may be employed but are generally less preferred.

The total amount of liquid component (active ingredient plus diluent) used in the formulation is usually within the range up to 200% based on the total weight of monomers used in preparing the product. With high liquid loadings however the products tend to be soft and gel-like or brittle, the actual properties depending on the nature of the liquids. Generally, to obtain a product of good mechanical properties suitable, for example, as a room-freshener which is required to be self-supporting, it is preferred that the total amount of liquid should not exceed 150% by weight of the total monomers, being typically 50-100%.

The compositions of our invention optionally contain water. The amount of water may be as high as 40% or more, but is typically up to 5% e.g. 2.5% by weight of the polymers. Sometimes water is required as a vehicle for the catalyst system used in preparing the polymer, e.g. a redox catalyst. However with other catalysts such as peroxides it is possible to prepare substantially anhydrous polymers.

The compositions of our invention may additionally contain relatively non-volatile additives such as colourings. Usually the compositions of our invention contain residues of the polymerisation catalyst or its degradation products.

The compositions of the invention may additionally contain an effective amount of a solubiliser for the active ingredient which is an organic liquid which is compatible with the polymer and the active ingredient. The solubiliser may be an organic compound having both hydrophilic and lipohilic characteristics.

Our novel polymer compositions are conveniently prepared by mixing together the monomers and a polymerisation catalyst in the presence of the active ingredient, and any diluent and water required. It is sometimes possible to polymerise the mixture without a catalyst, for example by heating or allowing the mixture to stand for a sufficient time, but for most practical purposes it is necessary to add a catalyst. In general the polymerisation is initiated by a free radical source, for example, an organic peroxide such as benzoyl peroxide, lauryl perdicarbonate or isobutyl peroctoate, or an azo compound such as azoisobutyronitrile, which generate free radicals on heating. However a problem which may arise with such initiators in systems which include volatile ingredients is that the elevated temperature required to initiate polymerisation in a commercially acceptable time, together with the heat released during the exothermic polymerisation reaction, can result in premature volatilisation of active ingredient or degradation of heat-sensitive material.

As already mentioned, this problem may be alleviated by having a suitable proportion of an inert diluent present in the formulation. It is however possible in many cases to use initiator systems which operate at lower temperatures and which in some preferred cases work satisfactorily at room temperature or below. These initiator systems belong to the general class of redox catalysts, which are combinations of oxidising and reducing agents.

The oxidising agent may be organic, such as one of the organic peroxides already mentioned, or inorganic, such as potassium or ammonium persulphate. A particularly preferred inorganic oxidising agent is hydrogen peroxide, which has the advantage that it is reduced to water and does not leave any residue of insoluble inorganic products in the polymer.

The oxidising agent may be used in conjunction with an inorganic reducing agent such as sodium thiosulphate or preferably an organic reducing agent such as ascorbic acid or araboascorbic acid (erythorbic acid). These last two are especially effective and maybe used as polymerisation catalysts in conjunction with an oxidising agent, especially a persulphate, or most preferably, hydrogen peroxide.

Mixtures of ascorbic acid and hydrogen peroxide are capable of initiating polymerisation rapidly at room temperature, so avoiding excessive heating of the polymer. Cocatalysts including amines and salts of transition metals such as copper, cobalt, iron, nickel, and manganese are also useful. The polymerising mixture is preferably netural or slightly acidic to water, and may benefit from the addition of small amounts of strong mineral acid especially when ascorbic acid and hydrogen peroxide is used as the catalyst system. For example, a few drops of any strong mineral acid which does not adversely affect the active ingredient or polymer may be added to the polymerising mixture, usually the most convenient being hydrochloric acid.

The use of these water-based initiator systems is dependent on the particular mixture of monomers, active agent and diluent having the ability to dissolve the amount of water required. Thus they are sometimes inconvenient when the monomer mixture contains higher proportions off the lipophilic component and the active ingredient and diluent are of relatively low polarity. In such cases it may be preferable to use a simple peroxide initiator activated by heating.

The proportion of polymerisation catalyst is not critical, although higher proportions will produce shorter average chain lengths. For practical purposes it is not usually convenient to add more than about 5% by weight of catalyst based on the total mixture, preferably 0.1 to 2.5%.

Polymerisation is preferably effected under an inert atmosphere of, for example $CO_2$ or nitrogen, or under air tight sealing films to avoid inhibition of polymerisation at the surface by oxygen.

The invention is illustrated by the following examples:

EXAMPLE 1

A simple violet-type fragrance was made up which had the following composition:

|  | parts by weight |
| --- | --- |
| Phenylethyl alcohol | 30 |
| Geraniol | 5 |
| Hydroxycitronellal | 15 |
| Amyl cinnamic aldehyde | 5 |
| Ionone | 35 |
| Benzyl acetate | 5 |
| Heliotropin | 5 |

It was incorporated into the following series of polymer formulations, in which no. 1 was a reference formulation containing no higher alkyl methacrylate comonomer, while in nos. 2-7 either 5% or 10% by volume of the hydroxypropyl methacrylate was replaced by the same volume of lauryl, stearyl or isodecyl methacrylate in accordance with our invention. The amount of crosslinking agent (trimethylolpropane trimethacrylate) was in each case adjusted to give a product of suitable hardness.

| Formulation: | 1 | 2 | 3 | 4 | 5 | 6 | 7 |
|---|---|---|---|---|---|---|---|
| Hydroxypropyl methacrylate | 20 | 19 | 18 | 19 | 18 | 19 | 18 |
| Trimethylolpropane trimethacrylate | 2.5 | 2.75 | 3.0 | 2.75 | 3.0 | 3.0 | 3.25 |
| Lauryl methacrylate | — | 1 | 2 | — | — | — | — |
| Stearyl methacrylate | — | — | — | 1 | 2 | — | — |
| Isodecyl methacrylate | — | — | — | — | — | 1 | 2 |
| Fragrance | 6 | 6 | 6 | 6 | 6 | 6 | 6 |
| Polyoxyethylene (9) nonyl phenol | 10 | 10 | 10 | 10 | 10 | 10 | 10 |
| 20% w/v aqueous ascorbic acid | 1 | 1 | 1 | 1 | 1 | 1 | 1 |
| 70% hydrogen peroxide | 0.05 | 0.05 | 0.05 | 0.05 | 0.05 | 0.05 | 0.05 |
| 4% w/v copper sulphate in HCl | 0.05 | 0.05 | 0.05 | 0.05 | 0.05 | 0.05 | 0.05 |

The above quantities are by volume, and samples were made using these actual quantities in milliliters. They were in the form of flat discs 85 mm. in diameter, formed by casting in glass dishes and covering with an oxygen-impermeable film during the polymerisation process.

The samples were wrapped in polyvinylidene chloride film ("Saran" type 3, 50 gauge) and placed in polythene bags which were hung in an oven at 45° C. with air circulation. At intervals over a period of 27 days they were removed and examined for exudation, with the results shown in the following table. The degree of exudation is expressed in the following terms:

sl. = slight; a noticeably greasy surface.
bad = an obviously wet surface.
v. bad = very bad; sufficient exuded liquid to run off the sample into folds in the film wrapping.

| Days at 45° C. | Degree of exudation; formulation. | | | | | | |
|---|---|---|---|---|---|---|---|
| | 1 | 2 | 3 | 4 | 5 | 6 | 7 |
| 1 | sl. | none | none | none | none | none | none |
| 3 | v. bad | " | " | " | " | " | " |
| 6 | " | " | " | " | " | " | " |
| 8 | " | " | " | " | " | sl. | " |
| 13 | " | " | " | " | " | bad | " |
| 16 | " | " | " | " | " | v. bad | " |
| 27 | " | " | " | " | " | " | " |

This demonstrates that under the conditions of the ageing test exudation was completely supressed by replacing 5% or 10% of the hydroxypropyl methacrylate in the formulation by lauryl or stearyl methacrylate. Isodecyl methacrylate was somewhat less effective in that exudation still occurred with only 5% replacement, though its onset was delayed; with 10% replacement however the exudation was again completely suppressed.

EXAMPLE 2

In this example two floral-type fragrances were used, and the effect on exudation of varying the proportion of lauryl methacrylate in a formulation was examined. Each fragrance was incorporated into the following series of polymer formulations in which No. 8 was a reference formulation while in Nos. 9, 10, 11 and 12 respectively 5, 10, 15, and 20% by volume of the hydroxypropyl methacrylate was replaced by the same volume of lauryl methacrylate in accordance with our invention.

| Formulation: | 8 | 9 | 10 | 11 | 12 |
|---|---|---|---|---|---|
| Hydroxypropyl methacrylate | 20 | 19 | 18 | 17 | 16 |
| Trimethylolpropane trimethyacrylate | 3.0 | 3.5 | 4.0 | 4.5 | 5.0 |
| Lauryl methacrylate | — | 1 | 2 | 3 | 4 |
| Fragrance | 6 | 6 | 6 | 6 | 6 |
| Polyoxyethylene (9) nonyl phenol | 10 | 10 | 10 | 10 | 10 |
| 20% w/v aqueous ascorbic acid | 1 | 1 | 1 | 1 | 1 |
| 70% hydrogen peroxide | 0.05 | 0.05 | 0.05 | 0.05 | 0.05 |
| 4% w/v copper sulphate in HCl | 0.025 | 0.025 | 0.025 | 0.025 | 0.025 |

The above quantities are by volume. Samples in the form of 85 mm. discs were made as described in Example 1, using these actual quantities in milliliters. They were wrapped in polyvinylidene chloride film, placed in polythene bags in an oven at 45° C. as described in Example 1 for a period of 34 days and were from time to time examined for exudation. The results for the two fragrances are shown in the following tables.

| Days at 45° C. | Degree of exudation; formulation: | | | | |
|---|---|---|---|---|---|
| | 8 | 9 | 10 | 11 | 12 |
| FRAGRANCE A | | | | | |
| 1 | bad | none | none | none | none |
| 3 | " | " | " | " | " |
| 7 | v. bad | sl. | " | " | " |
| 10 | " | bad | " | " | " |
| 14 | " | " | " | " | " |
| 21 | " | v. bad | " | " | " |
| 27 | " | " | " | " | " |
| 34 | " | " | " | " | " |
| FRAGRANCE B | | | | | |
| 1 | bad | none | none | none | none |
| 3 | v. bad | sl. | " | " | " |
| 7 | " | bad | " | " | " |
| 10 | " | v. bad | sl. | " | " |
| 14 | " | " | " | " | " |
| 21 | " | " | bad | " | " |
| 27 | " | " | " | " | " |
| 34 | " | " | " | " | " |

This demonstrates that under the test conditions the exudation of Flower Shop was completely suppressed by replacing 10% of the hydroxypropyl methacrylate by lauryl methacrylate, while 5% delayed the onset of exudation considerably. With Country Garden, which was known to have a greater tendency to exude, 15% of lauryl methacrylate was necessary to suppress the exudation completely through lower levels were effective in delaying its onset.

EXAMPLE 3

In this example the fragrances "A" and "B" mentioned in Example 2, and two more fragrances, a lavender and a honeysuckle fragrance were used. Mixtures of the following compositions were prepared. Quantities are by volume in milliliters.

| | | | | | | |
|---|---|---|---|---|---|---|
| Hydroxypropyl methacrylate | 17 | 19 | 16 | 18 | 13.5 | 18 |
| Lauryl methacrylate | 5 | 6 | 5 | 6 | 4.5 | 6 |
| Trimethylolpropane trimethylcrylate | 2 | 3.5 | 5 | 3 | 3 | 4 |
| "A" | 6 | — | — | — | — | — |
| "B" | — | 6 | 6 | — | — | — |
| Lavender fragrance | — | — | — | 6 | 6 | — |
| Honeysuckle fragrance | — | — | — | — | — | 6 |
| Diethyl phthalate | 6 | — | 7 | — | 6 | 6 |

In each of these mixtures was dissolved 0.5 g. of the initiator tert.-butylcyclohexyl perdicarbonate. Each of the resulting solutions was used to fill a plastics mould. The filled moulds were heated by immersion in a water bath which was initially at 60° C., the temperature being raised to 70° C. over a period of about ten minutes and held there for a further twenty minutes. Polymerisation took place giving transparent solid products. These were removed from the moulds, wrapped in polyvinylidene chloride film, placed in polythene bags and hung in an oven at 45° C. as described in Example 1. After 50 days none of the products had shown any sign of exudation.

We claim:

1. A cast and shaped hydrophilic polymer solid composition comprising:
   component (A), a synthetic hydroxyl containing polymer, said polymer being formed from a plurality of monomer units wherein,
   (i) from 1 to 75%, by weight relative to the weight of the polymer, of said monomer units are derived from a lipophilic alkyl acrylate or alkyl methacrylate having from 5 to 22 carbon atoms in the alkyl group;
   (ii) from 25 to 99% by weight, relative to the weight of the polymer, of said monomer units are derived from a hydrophilic hydroxyalkyl acrylate or hydroxyalkyl methacrylate having from 2 to 4 carbons in the hydroxyalkyl group;
   (iii) up to 50% by weight, relative to the weight of the polymer, of said monomer units are derived from at least one polyfunctional monomer having at least two unsaturated groups in the molecule;
   Component (B) water;
   Component (C) a volatilizable active ingredient dissolved in the composition and selected from the group consisting of a fragrance, an insecticide, an insecticidal synergist, a bacteriostat, aa pheromone, and a fabric softener; and
   Component (D), a nonionic surfactant;
   the amounts of said components (A), (B), (C) and (D) in the composition being, in parts, 100 parts A, 0 to 40 parts B, 2.5 to 100 parts C and up to 200 parts D.

2. A composition according to claim 1, wherein the alkyl group has from 10 to 18 carbon atoms.

3. A composition according to claim 1, wherein said hydrophilic hydroxyalkyl acrylated or hydroxyalkyl methacrylate is selected from hydroxy ethyl esters and hydroxypropyl esters.

4. A composition according to claim 1, wherein said polyfunctional monomer is selected from the di- and poly-acrylates and methacrylates of di- and polyhydroxylic alcohols.

5. A composition according to claim 4, wherein said polyfunctional monomer is an ester of trimethylolpropane.

6. A composition according to claim 4, wherein said polyfunctional monomer is an ester of pentaerythritol.

7. A composition according to claim 1, wherein the active ingredient is a fragrance.

8. The composition of claim 1 wherein the proportion of (ii) is within the range of from 60 to 98%, the proportion of (i) is within the range of from 2 to 40% and the proportion of (iii) is up to 25%.

9. The composition of claim 8 wherein the proportion of (ii) is within the range of 75 to 95%, the proportion of (i) is 5 to 25% and the proportion of (iii) is 10 to 20%.

10. The composition of claim 1 wherein the monomer units, water, active ingredient and nonionic surfactant starting materials and a polymerization catalyst are all blended together, cast in a shape-forming mold and polymerization is then carried out in the mold to obtain a shaped solid.

11. The composition of claim 1 wherein the component (ii) is hydroxypropyl methacrylate and the component (i) is selected from the group consisting of lauryl, stearyl and isodecyl methacrylate.

12. A composition according to claim 1 wherein the amounts of components (A), (B), (C) and (D) are, in parts, 100 parts Component A, up to 5 parts Component B, 5 to 50 parts Component C and 50 to 100 parts Component D.

13. A composition according to claim 1 wherein the polymer is formed from about 2 to 40% monomer (i), up to about 25% polyfunctional monomer (iii), and a remainder of monomer (ii).

14. A composition according to claim 1 wherein the polymer is formed from about 5 to 25% monomer (i), up to about 25% polyfunctional monomer (iii) and a remainder of monomer (ii).

15. A composition according to claim 1 wherein Component D is a polyoxyalkylene condensate with a fatty alcohol, an alkyl phenol, or glycerol, or is a polyoxyalkylene ester of a fatty acid.

16. A composition according to claim 15 wherein Component A is formed from monomer (i) having an alkyl group of 10 to 16 carbons; monomer (ii) selected from hydroxyethyl acrylate, hydroxyethyl methacrylate, hydroxypropyl acrylate or hydroxypropyl methacrylate; and monomer (iii) selected from a diacrylate or dimethacrylate of ethylene glycol, propylene glycol, 1,3-butylene glycol, 1,6-hexanediol glycerol, pentaerythritol or trimethylolpropane or a triacrylate or trimethacrylate of glycerol, pentaerythritol or trimethylolpropane; and the amounts of Components A, B, C and D are, in parts, 100 parts Component A, up to 5 parts Component B, 5 to 50 parts Component C and 5 to 50 parts Component D.

17. A composition according to claim 16 wherein Component A, the polymer is formed from lauryl methacrylate, hydroxypropyl methacrylate and monomer (iii) which is selected from pentaerythritol triacrylate and trimethylolpropane trimethacrylate; Component D is nonylphenoxy polyethoxyethanol; and Component C is a fragrance.

* * * * *